US 6,594,759 B1

(12) United States Patent
Wang

(10) Patent No.: US 6,594,759 B1
(45) Date of Patent: Jul. 15, 2003

(54) AUTHORIZATION FIRMWARE FOR CONDUCTING TRANSACTIONS WITH AN ELECTRONIC TRANSACTION SYSTEM AND METHODS THEREFOR

(75) Inventor: Ynjiun P. Wang, Cupertino, CA (US)

(73) Assignee: Esignx Corporation, Cupertino, CA (US)

(*) Notice: Subject to any disclaimer, the term of this patent is extended or adjusted under 35 U.S.C. 154(b) by 0 days.

(21) Appl. No.: 09/222,368

(22) Filed: Dec. 29, 1998

Related U.S. Application Data

(63) Continuation-in-part of application No. 08/759,555, filed on Dec. 4, 1996, now Pat. No. 5,917,913.

(51) Int. Cl.$^7$ .......................... H04L 9/30; H04L 12/22
(52) U.S. Cl. ................. 713/182; 713/150; 713/161; 713/172; 380/277
(58) Field of Search ................. 713/157, 150, 713/161, 172, 182, 184; 380/30, 247

(56) References Cited

U.S. PATENT DOCUMENTS

| | | | |
|---|---|---|---|
| 5,373,561 A | 12/1994 | Haber et al. ................. 380/49 |
| 5,416,842 A | 5/1995 | Aziz ........................... 380/30 |
| 5,440,633 A | 8/1995 | Augustine et al. ............ 380/23 |
| 5,455,863 A | 10/1995 | Brown et al. ................ 380/23 |
| 5,524,052 A | 6/1996 | Augustine et al. ............ 380/49 |
| 5,548,106 A | 8/1996 | Liang et al. ................. 235/454 |
| 5,586,304 A | * 12/1996 | Stupek et al. ............... 717/170 |
| 5,623,637 A | * 4/1997 | Jones et al. ................. 380/23 |
| 5,724,423 A | 3/1998 | Khello ........................ 380/23 |
| 5,796,840 A | * 8/1998 | Davis ......................... 705/51 |
| 5,841,865 A | * 11/1998 | Sudia ......................... 380/21 |
| 5,844,986 A | * 12/1998 | Davis ......................... 713/187 |
| 5,848,155 A | * 12/1998 | Cox .......................... 380/28 |
| 5,917,913 A | 6/1999 | Wang ......................... 380/25 |
| 6,088,687 A | 7/2000 | Leleu |
| 6,510,519 B2 | * 1/2003 | Wasilewski et al. ........ 713/168 |

OTHER PUBLICATIONS

The NPL Intelligent Token and Its Application, Wyn L. Price, National Physical Laboratory, Teddington, UK, Eurocrypt 1986.
Carol H. Fancher, "In your pocket smartcards," Electronic Payments, IEEE Spectrum, Feb. 1997, Motorola, Inc., pp. 47–53.

* cited by examiner

Primary Examiner—Gilberto Barron
Assistant Examiner—Kambiz Zand
(74) Attorney, Agent, or Firm—Moser, Patterson & Sheridan, LLP

(57) ABSTRACT

A computer configured to authenticate a user to an electronic transaction system is disclosed. The computer includes a central processing unit and electronic authorization firmware disposed within the computer and in electronic communication with the central processing unit. The electronic authorization firmware includes a non-volatile memory circuit configured to store at least one of a user private key and user identification data and a firmware identification data. The electronic authorization firmware further includes decryption logic circuitry disposed between the non-volatile memory circuit and the electronic transaction system. The decryption logic circuitry is configured to prevent unauthorized access to at least one of the user private key and the user identification data in the non-volatile memory circuit. The electronic authorization firmware also includes encryption logic circuit coupled to the electronic transaction system and configured to transmit digital data encrypted using the user private key for transmission to the electronic transaction system. The digital data authenticates the user to the electronic transaction system, wherein the non-volatile memory is inaccessible by the central processing unit without traversing the decryption logic circuitry.

25 Claims, 12 Drawing Sheets

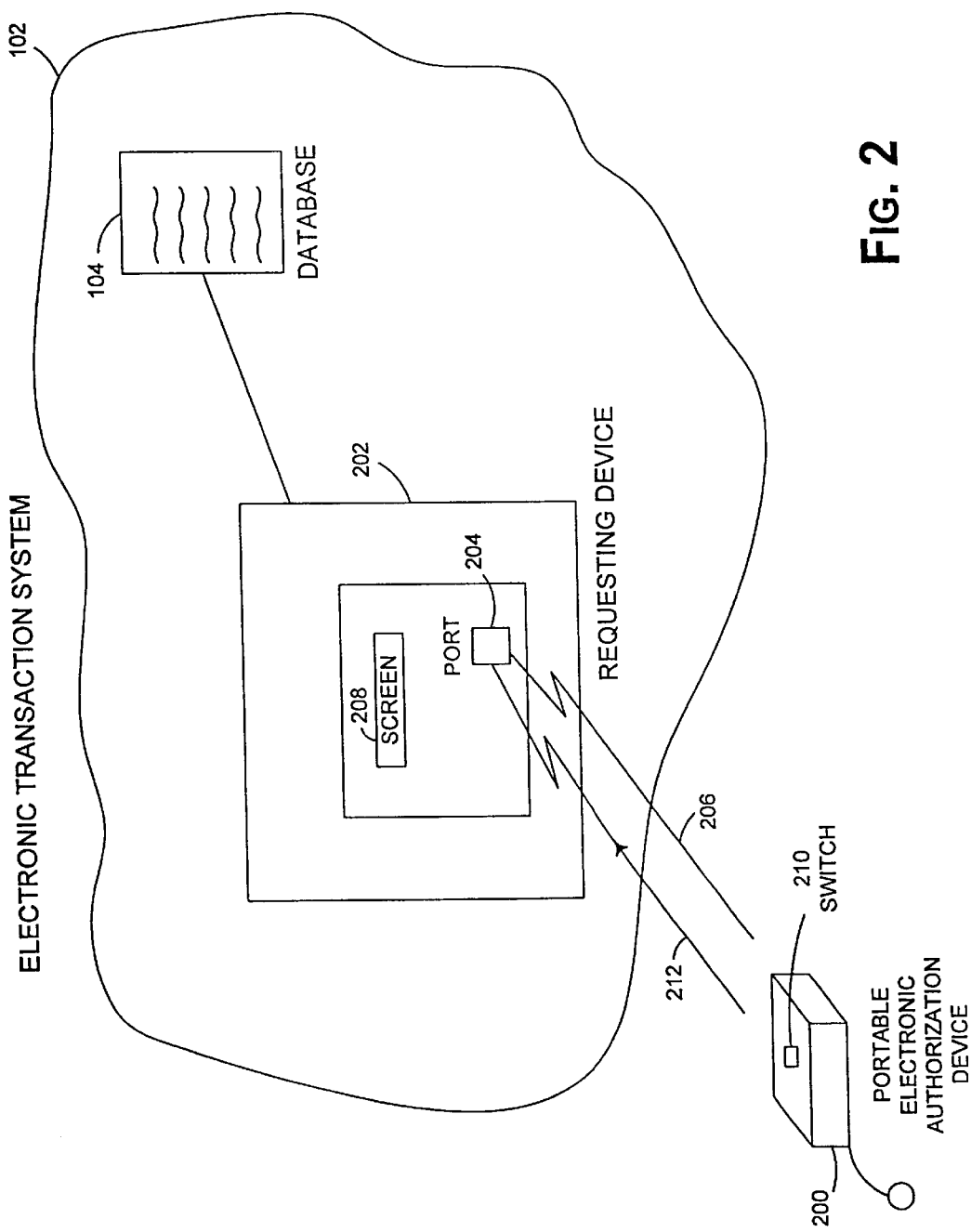

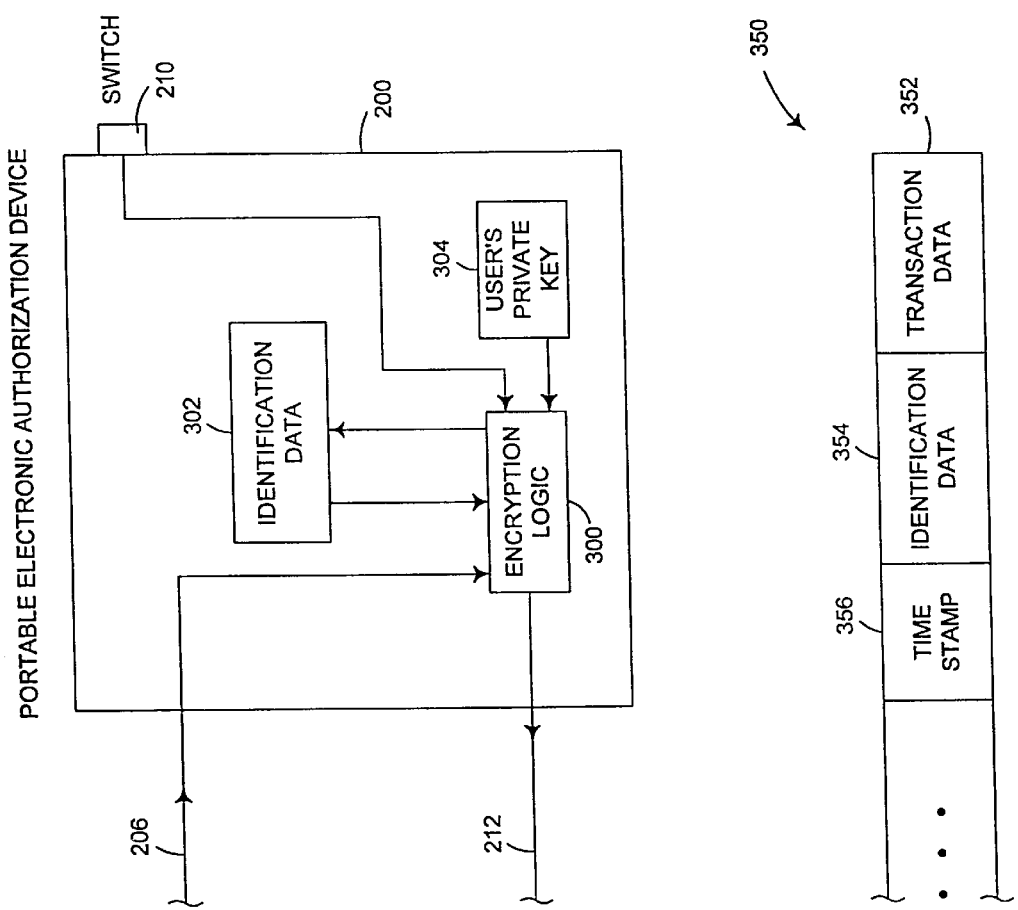

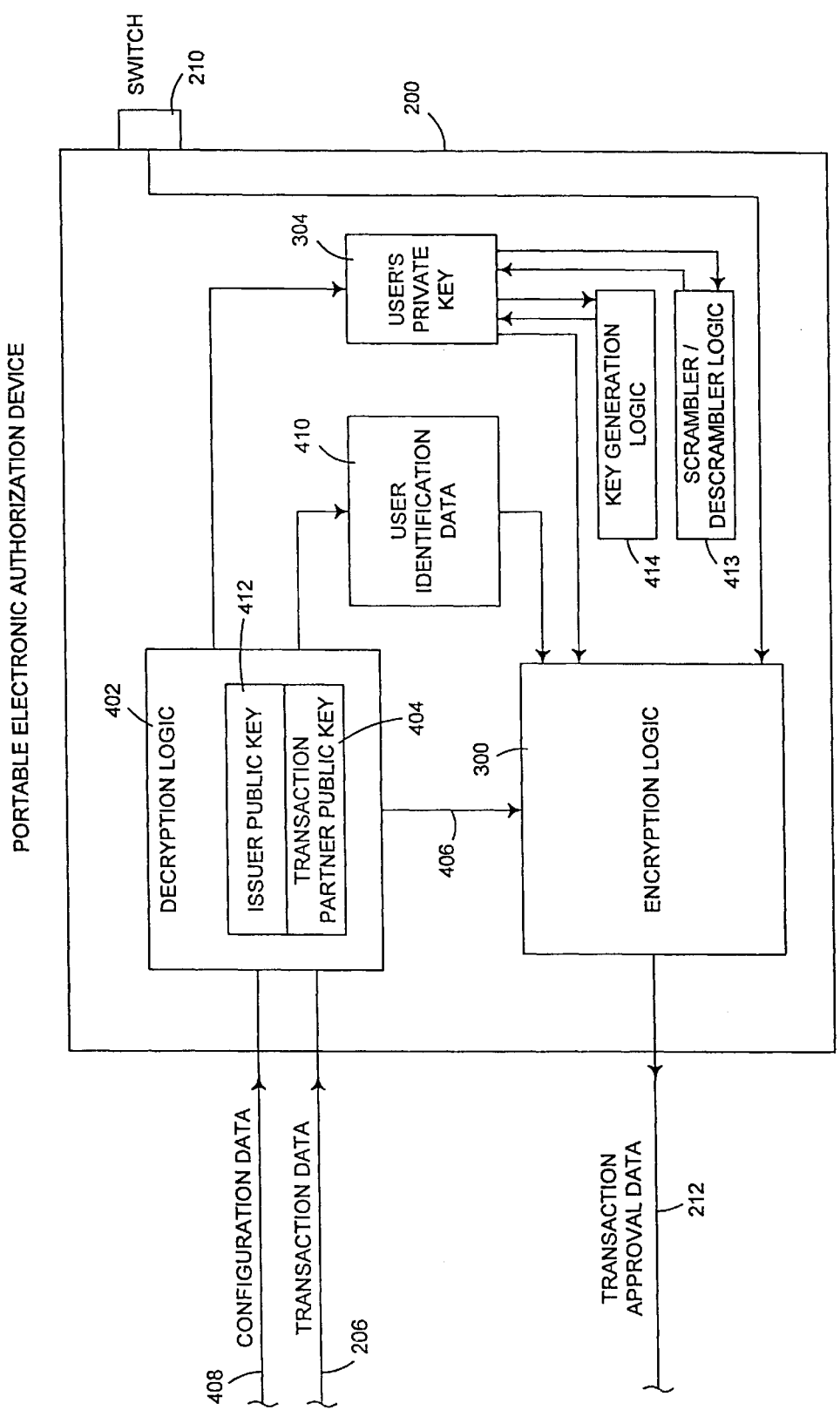

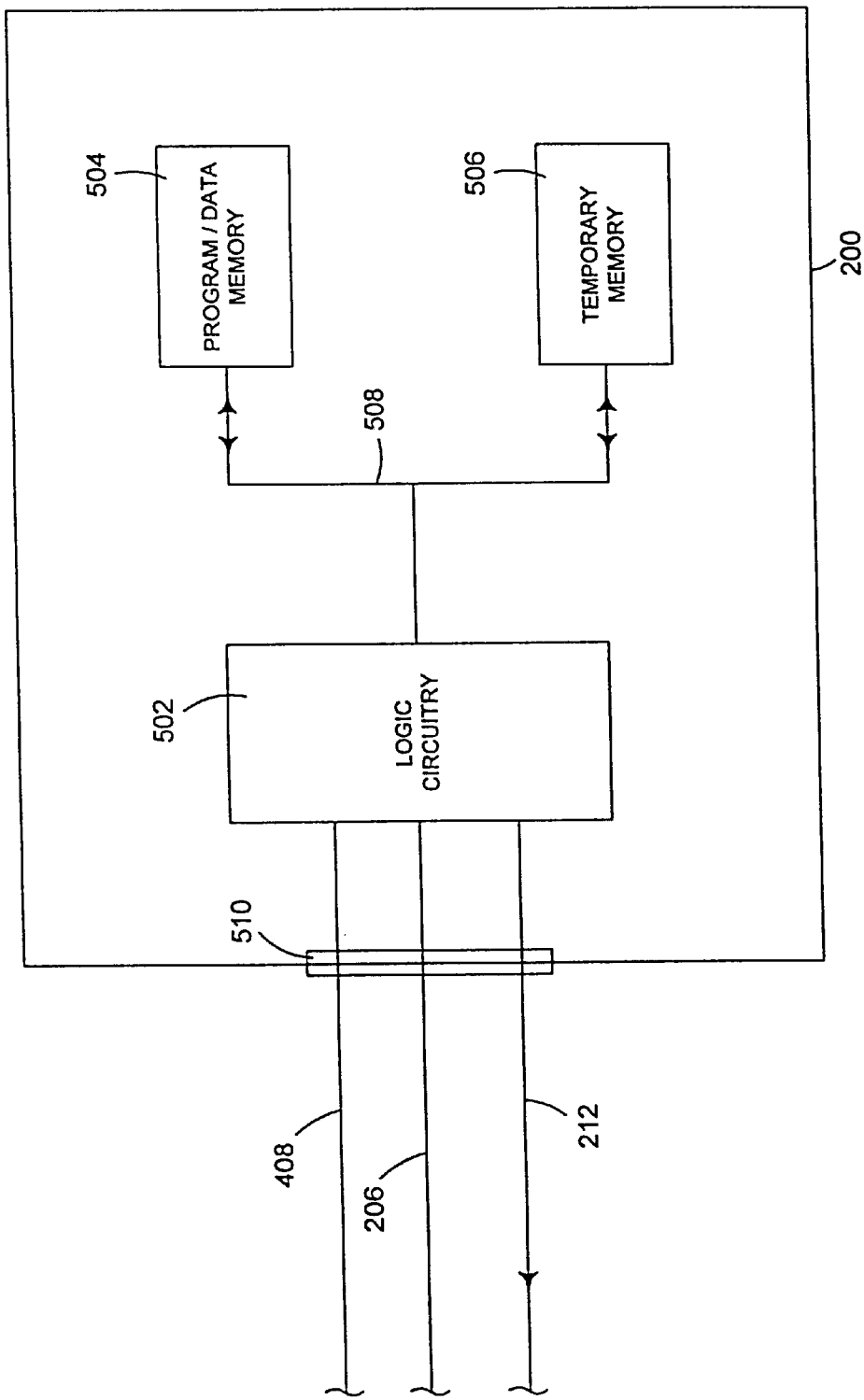

US 6,594,759 B1

AUTHORIZATION FIRMWARE FOR CONDUCTING TRANSACTIONS WITH AN ELECTRONIC TRANSACTION SYSTEM AND METHODS THEREFOR

This application is a continuation of a patent application entitled "Portable Electronic Authorization Devices and Methods Therefor," filed Dec. 4, 1996 by inventor Ynjiun P. Wang (U.S. application Ser. No. 08/759,555) now U.S. Pat. No. 5,917,913

BACKGROUND OF THE INVENTION

The present invention relates to methods and apparatus for conducting electronic transactions. More particularly, the present invention relates to portable electronic authorization devices (PEADs) which advantageously and substantially eliminate the security risks associated with prior art techniques of approving transactions between a user and an electronic transaction system.

Electronic transaction systems are known. An electronic transaction system typically permits a user to conduct designated transactions electronically, which substantially improves efficiency and convenience to the user. Examples of electronic transactions include transactions conducted via computer networks, automated teller machines (ATM's), automated point-of-sale systems, automated library systems, and the like. Transactions conducted via computer networks may encompass a wide range of transactions, including exchanging information and data via a computer network popularly known as the Internet, e.g., to make a purchase from a vendor on the network. ATM's typically permit users to conduct financial transactions (such as withdrawals, transfers, deposits, and the like) vis-à-vis a financial institution in an electronic manner. Automated point-of-sale systems may be employed by merchants to permit users to purchase products or services using the users' electronic account, and automated library systems may be employed to permit library users to check out and return library materials. Other examples of electronic transaction systems are readily available in popular literature and are not enumerated herein for brevity sake.

To enhance security to the user's account, electronic transaction systems typically request the user to provide identification data to authenticate himself as the user authorized to approve the proposed transaction or transactions. If the user fails to provide the requested identification data, the proposed transaction or transactions are not authorized and will not be processed. The identification data may be required with each transaction. By way of example, an automated point-of-sale system may require the user to approve a purchase transaction and will accept an approval message only if it is satisfied that the person approving the transaction has furnished adequate identifying data authenticating himself as the person authorized to perform the approval. Alternatively, the identification data may be entered by the user at the start of a session to authenticate himself and enable that user to subsequently perform any number of transactions without further authentication.

In the prior art, users are typically required to manually enter the identification data into the electronic transaction system for authentication. Typically, the entry of identification data involves typing in a password on a numeric keypad or on a keyboard. The identification data is then compared with data previously stored within the electronic transaction system, and authentication is satisfied when there is a match. As mentioned previously, the transaction or transactions proposed will not be allowed to proceed if there is no match.

Although prior art electronic transaction systems provide some protection from unauthorized access and use of the user's account, there are disadvantages. To illustrate certain disadvantages associated with prior art electronic transaction systems, reference may be made to FIG. 1 herein. FIG. 1 shows an automated teller machine (ATM) 100, representing the requesting device of an electronic transaction system 102. Electronic transaction system 102 may include, for example, a central database 104 which contains previously-stored identification data and account data of user 106.

To initiate a typical transaction with ATM 100, user 106 first inserts a data card 107, such as a bank card or a credit card, into a card reader 109. Data card 107 typically includes a magnetic stripe that contains the account number and other information related to the user, which may then be read by card reader 109. The data stored in data card 107 enables electronic transaction system 102 to ascertain which account in database 104 user 106 wishes to transact business.

Via a keypad 108 on ATM 100, user 106 may then be able to enter his identification data, e.g., his personal identification number (PIN), to authenticate himself. If the entered identification data matches the identification data stored with the account in database 104 that is identified by data card 107, the user is authenticated and granted access to his account. If there is no match, authentication fails. After authentication, user 106 may be able to, for example, employ a combination of keypad 108 and a screen 110 to withdraw cash from his account, which results in cash being dispensed from ATM 100 and the balance in his account within database 104 correspondingly reduced.

Theoretically, the identification data entered into ATM 100 should be secure. In reality, there are many potential security risks to the identification data in prior art authentication techniques. Since the identification data is not encrypted before being entered into ATM 100, the non-encrypted identification data is vulnerable to unauthorized access and procurement. Encryption of the identification data is not practical in the prior art since it would have been too complicated and/or inconvenient for the user to perform encryption or memorize the encrypted identification data. Unauthorized procurement of the identification data in the prior art may occur, for example, upon entry if it is inadvertently seen by another party, e.g., by another person behind user 106, either on screen 110 or more likely at keypad 108.

Even if encryption is employed on the identification data in the prior art, e.g., prior to transmission from ATM 100 to database 104, the encryption typically occurs within ATM 100 and still requires the entry of non-encrypted identification data from user 106 and the existence of the identification data for some duration of time in ATM 100. Unauthorized access to the identification data may then occur if an unauthorized party is able to gain entry into ATM 100 and intercepts, e.g., via software or hardware implemented in ATM 100, the non-encrypted identification data therein.

Furthermore, if public key cryptography is employed within ATM 100, the storage of the user's private key within ATM 100 renders this private key vulnerable to theft, further exposing the user's account to risk. The stolen password and/or private key may then be employed to allow unauthorized persons to access the user's account to the user's detriment.

In view of the foregoing, there are desired apparatus and methods for conducting transactions with the electronic transaction system while substantially eliminate the risk of unauthorized access to the user's account and unauthorized procurement of the user identification data. Preferably, such an apparatus should be easily portable to permit the user to conveniently and comfortably perform transaction authentication anywhere.

SUMMARY OF THE INVENTION

The invention relates, in one embodiment, to a computer configured to authenticate a user to an electronic transaction system. The computer includes a central processing unit and electronic authorization firmware disposed within the computer and in electronic communication with the central processing unit. The electronic authorization firmware includes a non-volatile memory circuit configured to store at least one of a user private key and user identification data and a firmware identification data. The electronic authorization firmware further includes decryption logic circuitry disposed between the non-volatile memory circuit and the electronic transaction system. The decryption logic circuitry is configured to prevent unauthorized access to at least one of the user private key and the user identification data in the non-volatile memory circuit. The electronic authorization firmware also includes encryption logic circuit coupled to the electronic transaction system and configured to transmit digital data encrypted using the user private key for transmission to the electronic transaction system. The digital data authenticates the user to the electronic transaction system, wherein the non-volatile memory is inaccessible by the central processing unit without traversing the decryption logic circuitry.

The invention relates, in another embodiment, to a method for allowing an issuer of an electronic authorization firmware to configure the electronic authorization firmware to authenticate, in a secure manner, a user to an electronic transaction system. The method includes receiving at the electronic authorization firmware first digital data that represents at least one of a user private key, a user public key, and a user identification data and a firmware identification data. The first digital data is encrypted by an issuer private key prior to the receiving at the electronic authorization firmware. The method further includes decrypting, using a decryption logic circuit and an issuer public key, at least one of the user private key, the user public key, and the user identification data and firmware identification data. The method additionally includes storing at least one of the user private key, the user public key, and the user identification data in a non-volatile memory circuit of the electronic authorization firmware, wherein at least one of the user private key, the user public key, and the user identification data and the firmware identification data is employed after configuration of the electronic authorization firmware to the user to the electronic transaction system.

These and other advantages of the present invention will become apparent upon reading the following detailed descriptions and studying the various figures of the drawings.

BRIEF DESCRIPTION OF THE DRAWINGS

To facilitate discussion.

FIG. 2 illustrates, in accordance with one embodiment of the present invention, a portable electronic authorization device (PEAD), representing the apparatus for securely approving transactions conducted vis-à-vis an electronic transaction system.

FIG. 3A shows, in one embodiment of the present invention, a simplified schematic of the PEAD of FIG. 2.

FIG. 3B shows, in one embodiment, the format of representative transaction approval data.

FIG. 4 illustrates, in accordance with one embodiment of the present invention, a logic block schematic of the PEAD.

FIG. 5A represents, in accordance with one embodiment of the present invention, a high level hardware implementation of the PEAD.

DETAILED DESCRIPTION OF THE PREFERRED EMBODIMENTS

Figure 1:
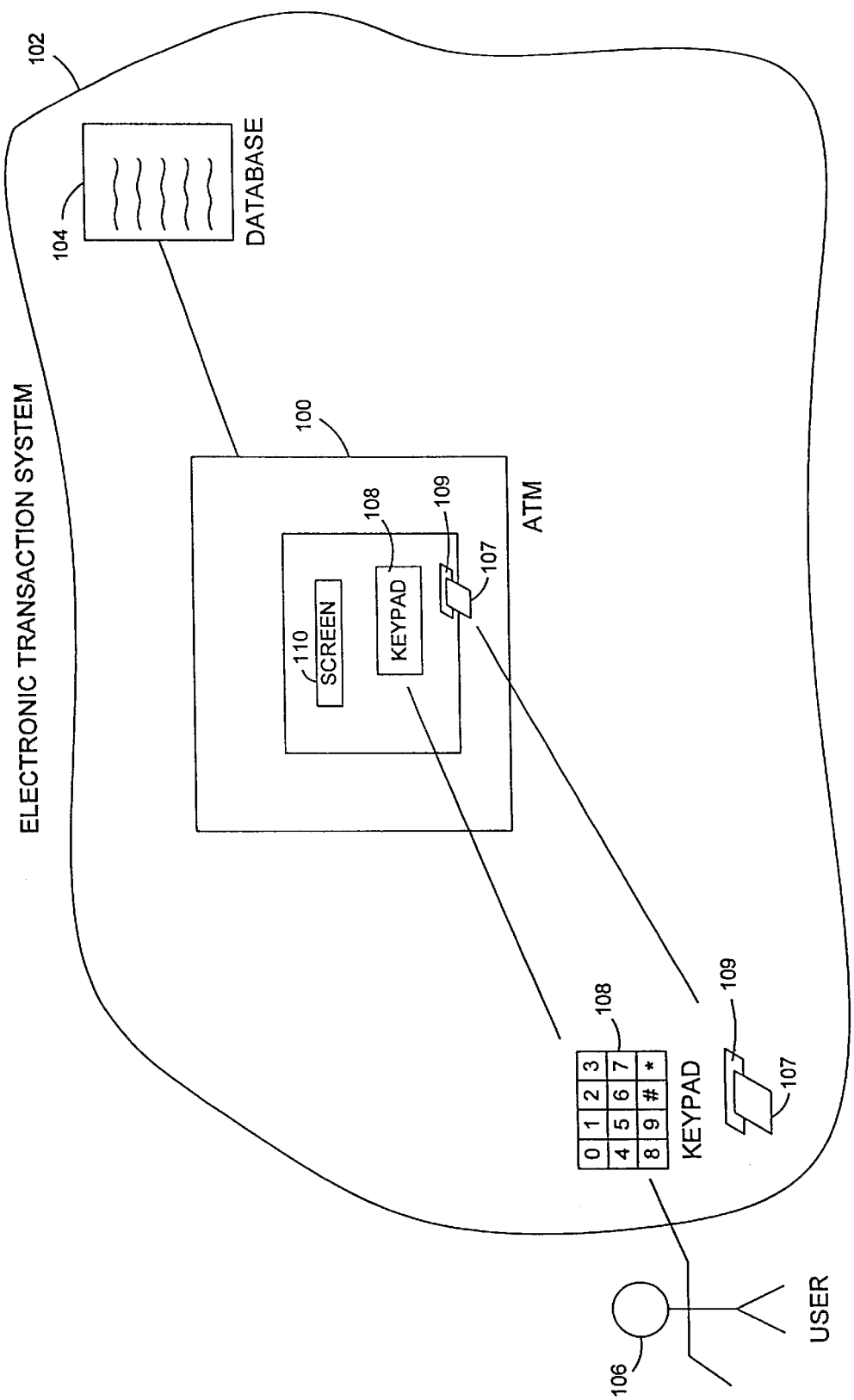
FIG. 1 shows a prior art electronic transaction system, including an automated teller machine (ATM).

FIG. 2 illustrates, in accordance with one embodiment of the present invention, a portable electronic authorization device (PEAD) 200, representing the apparatus for securely approving transactions conducted vis-à-vis an electronic transaction system. With reference to FIG. 2, requesting device 202 may initiate a transaction approval process with PEAD 200 by transmitting to PEAD 200, via communication port 204, a transaction request pertaining to a proposed transaction. Requesting device 202 may represent, for example, an ATM machine, a computer terminal in a network, an automated library check-out terminal, or similar devices for permitting the user to transact business with the electronic transaction system. The proposed transaction may be, for example, a sale transaction of a particular item for a certain amount of money. The transaction request itself may include, for example, the transaction ID, the merchant's name, the merchant's ID, the time of the proposed purchase, and the like. In one embodiment, the transaction request from requesting device 202 may be encrypted for enhanced security but this is not required. Data pertaining to the proposed transaction reaches PEAD 200 via path 206 in FIG. 2.

Port 204 may represent an infrared port to facilitate infrared communication with PEAD 200. Alternatively, port 204 may represent a wireless port for facilitating wireless communication. Port 204 may even represent a contact-type connection port, such as a magnetic read/write mechanism or a plug having electrical contacts for directly plugging PEAD 200 into port 204 to facilitate communication. Other techniques to facilitate communication between requesting device 202 and PEAD 200 are readily appreciable to those skilled.

The data pertaining to proposed transaction(s) may then be reviewed by the user, either on a screen 208 of requesting device 202 or optionally on a display screen provided with PEAD 200 (not shown in FIG. 2). If the user approves the transaction, e.g., a purchase of an item for a given amount of money, the user may then signify his approval by activating a switch 210 on PEAD 200, which causes an approval message to be created with the user's identification data, encrypted and transmitted back to requesting device 202 via path 212. If the transaction is not approved, the user may simply do nothing and let the transaction request times out after an elapsed time or may activate another switch on PEAD 200 (not shown in FIG. 1), which causes a reject message, either encrypted or non-encrypted, to be transmitted back to lo the requesting device 202 via path 212.

The present invention is different from the prior art technique of FIG. 1 in that the user is required in the prior art to enter his identification data into the electronic transaction system, e.g., into ATM 100, to authenticate himself. In contrast, the present invention keeps the identification data related to the user secure within PEAD 200 at all times. Transaction approval occurs within PEAD 200, and the data representing such approval is encrypted, again within PEAD 200, prior to being transmitted to the electronic transaction system, e.g., to requesting device 202 in FIG. 2.

Accordingly, even if the approval data is intercepted, its encryption would prevent unauthorized users from employing the identification data for illicit purposes. If public key cryptography is employed to encrypt the approval data, the user's private key is also always kept within PEAD 200. Since the user's private key is required for encryption and is unknown to others, even to the electronic transaction system in one embodiment, the encrypted approval data, if intercepted, would be useless to unauthorized third parties even if the approval data can be deciphered using the user's public key. Again, this is different from prior art authentication techniques wherein encryption takes place within the electronic transaction system and requires the entry of the identification data and/or reading the user's private key from the ID card such as an ATM card, a credit card, and the like. As mentioned earlier, the fact that the prior art electronic transaction system requires this identification data and/or user's private key exposes these data to risks, e.g., if the requesting device is not secure or open to data interception via software or hardware.

As another difference, the present invention employs the circuitries within the portable electronic authorization device (PEAD) to perform the approval and encryption of the transaction approval data within the PEAD itself. In contrast, prior art data cards are essentially passive devices. For example, prior art ATM cards or credit cards only has a magnetic stripe for storing account information and do not have any facility to perform approval and/or encryption of the transaction approval data. While smart cards or IC cards, which are currently being developed, may contain electronic circuitries, current standards for their implementation still requires a reader associated with the requesting device to read out the identification data and/or user's private key in order for the requesting device to perform any approval and/or encryption. As mentioned earlier, the transmission of these data to the requesting device unnecessarily exposes these data to risks of theft and/or unauthorized interception once transmitted.

It should be borne in mind at this point that although public key cryptography is discussed throughout this disclosure to facilitate ease of understanding and to highlight a particular aspect of the invention, the overall invention is not limited to any particular cryptography algorithm and may be implemented using any conventional cryptography technique, including public key cryptography algorithms such as RSA, Diffie-Hellman, other discrete logarithm systems, elliptic curve systems, or the like. For additional information on some of the different public key cryptography techniques, reference may be made to, for example, the IEEE P1363/D8 Standard Specifications for Public Key Cryptography dated Oct. 5, 1998, available from IEEE Standards Dept. 345 East 7th Street, New York, N.Y. 10017-2349.

As mentioned, transaction approval in the prior art occurs within the electronic transaction system. In contrast, the present invention allows transaction approvals to occur within PEAD 200. The fact that transaction approvals occur entirely within PEAD 200 provides many advantages. By way of example, this feature eliminates the need to have, in one embodiment, the identification data and/or the user's private key in the requesting device. The fact that transaction approvals occur entirely within PEAD 200 (using the user identification data and/or the user's private encryption key that are always kept secure within PEAD 200) substantially enhances the confidentiality of the user identification data and the user's private key, as well as the integrity of the transaction approval process.

Since approval occurs entirely within PEAD 200, the user identification data that is employed to authenticate transactions may be more complicated and elaborate to ensure greater security. By way of example, the user identification data may be more elaborate than a simple password and may include any of the user's name, his birth date, his social security number, or other unique biometrics or unique identifying data such as fingerprint, DNA coding sequence, voice print, or the like. In contrast, prior art authentication techniques limit the user identification data to simple patterns, e.g., simple password of few characters, that are easily memorized by the user since more elaborate identification data may be too difficult to remember or too cumbersome to manually enter. Furthermore, even if the complicated ID data may be stored in the prior art data card, it is still required to be read into the requesting device of the electronic transaction system, again exposing this data to interception or theft once read.

Additional safeguards, which will be described in detail herein, may also be provided to prevent access, whether electronically or by physical means, to the user identification data and/or the user's private key within PEAD 200. Since the identification data and/or the user's private key are never exposed, security risks to the these data are substantially minimized. FIG. 3A shows, in one embodiment of the present invention, a simplified schematic of PEAD 200 of FIG. 2, including switch 210. Data path 206 is provided for receiving transaction requests from the electronic transaction system, and data path 212 is provided for transmitting transaction approval data back to the electronic transaction system. It should be borne in mind that although two data paths are discussed herein for ease of understanding, these data paths and other data paths herein may, in one embodiment, represent logical data paths and may be implemented via a single physical data connection. Likewise, the different ports herein may represent, in one embodiment, logical data ports for ease of understanding and may in fact be implemented using a single physical port.

When a transaction request, e.g., a withdrawal transaction from an ATM machine in the amount of $200.00, is transmitted via data path 206 to PEAD 200, this transaction is received by encryption logic 300. At this point, the user may review the proposed transaction, e.g., via the display screen provided with the electronic transaction system and/or PEAD 200, and has a choice to either approve or disapprove the proposed transaction. If the user approves the transaction, he may, in one embodiment, activate a switch 210, which causes the transaction approval data to be created and then encrypted by encryption logic 300 prior to being transmitted back to the electronic transaction system via path 212.

Note that the user identification data block 302, which is employed in the transaction approval process, is not directly coupled to paths 206 and 212. In other words, the memory portion storing the user identification data is intentionally decoupled from the input and output ports of PEAD 200 to prevent direct access thereto.

If access to user identification data 302 is desired, e.g., to approve a transaction, the access can only be made by encryption logic block 300. Likewise, it is not possible to directly access the memory portion 304, which stores the user's private key. If access to user's private key 304 is desired, e.g., to encrypt the transaction approval data, the access can only be made by encryption logic block 300. It should be borne in mind that although user identification 302 and user's private key 304 are shown stored in different memory portions, such illustration is made for ease of understanding and both of these may in fact be stored, in one embodiment, at different addresses on the same memory module.

In some cases, the transaction approval data requires the inclusion of certain pieces of identification data 302. For example, a transaction embodied in the transaction request from the electronic transaction system may be appended with data representative of an "electronic signature" prior to being encrypted and retransmitted back to the electronic transaction system. FIG. 3B shows, in one embodiment, the format of representative transaction approval data 350. With reference to FIG. 3B, transaction data 352, representing a portion of or the entire transaction request received from the electronic transaction system, is appended with certain user identification data 354 and optionally a time stamp 356. The formation of transaction approval data 350 only occurs if the transaction request has already been approved by the user. Once appended, transaction approval data 350 is then encrypted prior to being retransmitted back to the electronic transaction system.

In some cases, it may be desirable to encrypt the transaction request prior to transmission to the PEAD to further enhance security. For example, certain transaction partners, e.g., vendors or other users on the computer network, may wish to keep the information within a transaction request confidential and may prefer to encrypt the transaction request before furnishing it to the PEAD. Data encryption is also desirable when, for example, the user identification data and the user's private key is written into a blank PEAD for the first time to configure a PEAD that is unique to a given user. The configuration data pertaining the user identification data and the user's private key, while must be written only once into PEAD 200 by the issuer of PEAD 200, is preferably encrypted to render them less vulnerable to theft. Issuers of PEAD 200 may represent, for example, credit card issuers, the government, or any other institution with whom the user maintains an account.

FIG. 4 illustrates, in accordance with one embodiment of the present invention, a schematic of PEAD 200 of FIG. 2. The PEAD 200 of FIG. 4 further employs decryption logic for receiving the encrypted configuration data and optionally the encrypted transaction requests. In FIG. 4, encryption logic 300, user's private key 304, and data paths 206 and 212 are arranged and function substantially as discussed in connection with FIG. 3A.

Transaction requests are normally non-encrypted, i.e., they are received and processed in the manner discussed in connection with FIG. 3A. For highly sensitive transactions, however, the transaction requests may be encrypted and transmitted to PEAD 200 via data path 206 and input into decryption logic 402 to be decrypted. If a public key cryptography is employed, the encrypted transaction requests may be decrypted with a transaction partner public key 404.

Once decrypted, the transaction request is then displayed to the user for approval. The transaction approval data may be furnished to encryption logic 300 via path 406 to be encrypted if approved, e.g., responsive to the activation of switch 210. The encryption is preferably performed with the user's private key 304 if a public key cryptography technique is employed, and the encrypted transaction approval data is then transmitted back to the electronic transaction system via data path 212.

As configuration data typically includes sensitive user identification data and user's private key, it is often encrypted prior to being transmitted to PEAD 200 via data path 408. The encrypted configuration data is received by decryption logic 402 and decrypted therein prior to being written into user identification data block 410 and user's private key block 304. If public key cryptography is employed, the encrypted configuration data may be encrypted by the issuer's private key in the electronic transaction system prior to transmission and decrypted once received by PEAD 200 with an issuer public key 412. As can be appreciated from those skilled in the art from the above stated method, one of the configuration data may of course be the PEAD identification data (PEAD ID) digitally signed by the issuer or the manufacturer private key.

Note that once the configuration data is decrypted and written into user identification data block 410 and user's private key block 304, the user identification data and user's private key can only be accessed subsequently by encryption logic 300. Also note that there is no direct connection from any of the I/O data paths, e.g., data path 206, 212, or 408, to user identification data block 410 as well to user's private key block 304. Advantageously, the sensitive user identification data and user's private key therein are not susceptible to access from outside once written into respective blocks 410 and 304 (which may, in one implementation, simply represent memory blocks in PEAD 200's memory).

Additionally, the user identification data and the user's private key cannot be updated by those not having the issuer's private key. As represented in FIG. 4, data can only be written into user's private key block 304 and user identification block 410 after it is decrypted via decryption logic 402 with issuer public key 412. Accordingly, unless the updated configuration data has been encrypted using the issuer's private key (which is presumably highly secure), the updated configuration data will not be decrypted and written into respective blocks 304 and 410. Of course if the configuration data within blocks 304 and 410 cannot be updated physically, e.g., they are stored using memory that can be written only once such as PROM (programmable read-only memory), WORM (write once, read many), or the like, the security consideration associated with unauthorized alteration of configuration data is substantially eliminated.

If a greater level of security is desired, the user's private key may be optionally be scrambled or randomized prior to being written into user's private key block 304 by optional scrambler/descrambler logic 413. Scrambler/descrambler logic 413 may, in one embodiment, receive the user's private key, which is furnished by the institution that issues PEAD 200 to the user, and scrambles and/or randomizes it to generate yet another user's private key and a corresponding user's public key. This scrambled/randomized user's private key is then stored in user's private key block 304, which is now unknown even to the issuer of PEAD 200, and the corresponding user's public key may be made known to the issuer and/or the transaction partners to facilitate transactions. Advantageously, there is no other copy of the scrambled/randomized user's private key anywhere else beside within user's private key block 304.

In an alternative embodiment, there may be employed an optional key generation logic 414 which, responsive to a request from the issuing institution, generates the user's private key and the user's public key on its own, i.e., without first requiring the receipt of a user's private key from the issuing institution and randomizing it. The generated user's private key is then stored in private key block 304 and the public key is made known to the issuing institution and/or the transaction partners to facilitate transactions. In this manner, no version of the user's private key, whether randomized or not, exists outside the PEAD itself. As can be appreciated by those skilled in the art, the use of key generation logic 414 further enhances the confidentiality of the user's private key.

FIG. 5A represents, in accordance with one embodiment of the present invention, a high level hardware implementation of PEAD 200. As shown in FIG. 5A, PEAD 200 includes logic circuitry 502, which may represent a central processing unit such as a microprocessor or a microcontroller, discrete logic, programmable logic, an application-specific integrated circuit (ASIC), or the like, for implementing encryption logic 300 of FIG. 2 and optionally decryption logic 402 of FIG. 4.

Program/data memory 504 stores, among others, the codes which operate PEAD 200 as well as the user identification data and the user's private key. Program/data memory 504 is preferably implemented using some form of non-volatile memory (NVM) such as flash memory, electrically programmable read-only memory (EPROM), electrically erasable, programmable read-only memory (EEPROM), or the like. Temporary memory 506 serves as a scratch pad for calculation purposes and for temporary storage of data, and may be implemented using some form of random access memory (RAM) such as static RAM or dynamic RAM, which are known in the art. Alternatively, either optical memory, magnetic memory, or other types of memory may be employed to implement program/data memory 504 and/or temporary memory 506.

A bus 508 couples program/data memory 504 and temporary memory 506 with logic circuitry 502. Communication port 510 represents the communication gateway between PEAD 200 and the electronic transaction system and may be implemented using infrared technology, wireless RF technology, a magnetic read/write head, a contact-type plug for facilitating serial or parallel data transmission, or the like. Communication port may also represent, in one embodiment, a PC card port (popularly known to those skilled as a PCMCIA card). Data path 206 inputs transaction requests into logic circuitry 502 while data path 212 outputs transaction approval data from logic circuitry 502 to the electronic transaction system. Optional data path 408, which has been described in FIG. 4, inputs configuration data into PEAD 200 to write the user identification data and the user's private key into program/data memory 504 to uniquely configure PEAD 200 to a particular user.

Again, note that access to program/data memory 504 and the data therein (e.g., the user identification data and the user's private key) can only be made by logic circuitry 502. For example, the user identification data and the user's private key can only be written into program/data memory 504 if this data has been properly encrypted with the issuer's private key. Access to these memory blocks for writing thereto may also be restricted by logic circuitry 502 under appropriate software and/or firmware control.

Similarly, reading the user identification data and accessing the user's private key can only be accomplished via the encryption logic of logic circuitry 502. The advantages to security of this aspect has been discussed in connection with FIGS. 3A and 4, the most important point being there is preferably no direct access to the sensitive user identification data and user's private key from the outside. Consequently, the confidentiality and security of these data items are greatly enhanced with the inventive design.

Some type of power source, such as a battery, may be provided as well. If PEAD 200 is implemented as a single-chip design, i.e., substantially all components shown in FIG. 5A are fabricated on a single die, then power is external to the die itself. If contact-type communication is employed, e.g., if PEAD 200 must be plugged into the electronic transaction system to conduct transactions, power external to the entire PEAD may be employed for transaction approvals when plugged in, thereby eliminating the size, weight, and cost penalties associated with having a battery onboard the portable transaction apparatus.

In one embodiment, PEAD 200 may be implemented using a general purpose portable computing device, such as any of the miniaturized portable computers or personal digital assistants (PDA's) that are currently popular. A PDA such as the Apple Newton®, for example, may be employed to implement PEAD 200.

Figure 5B:
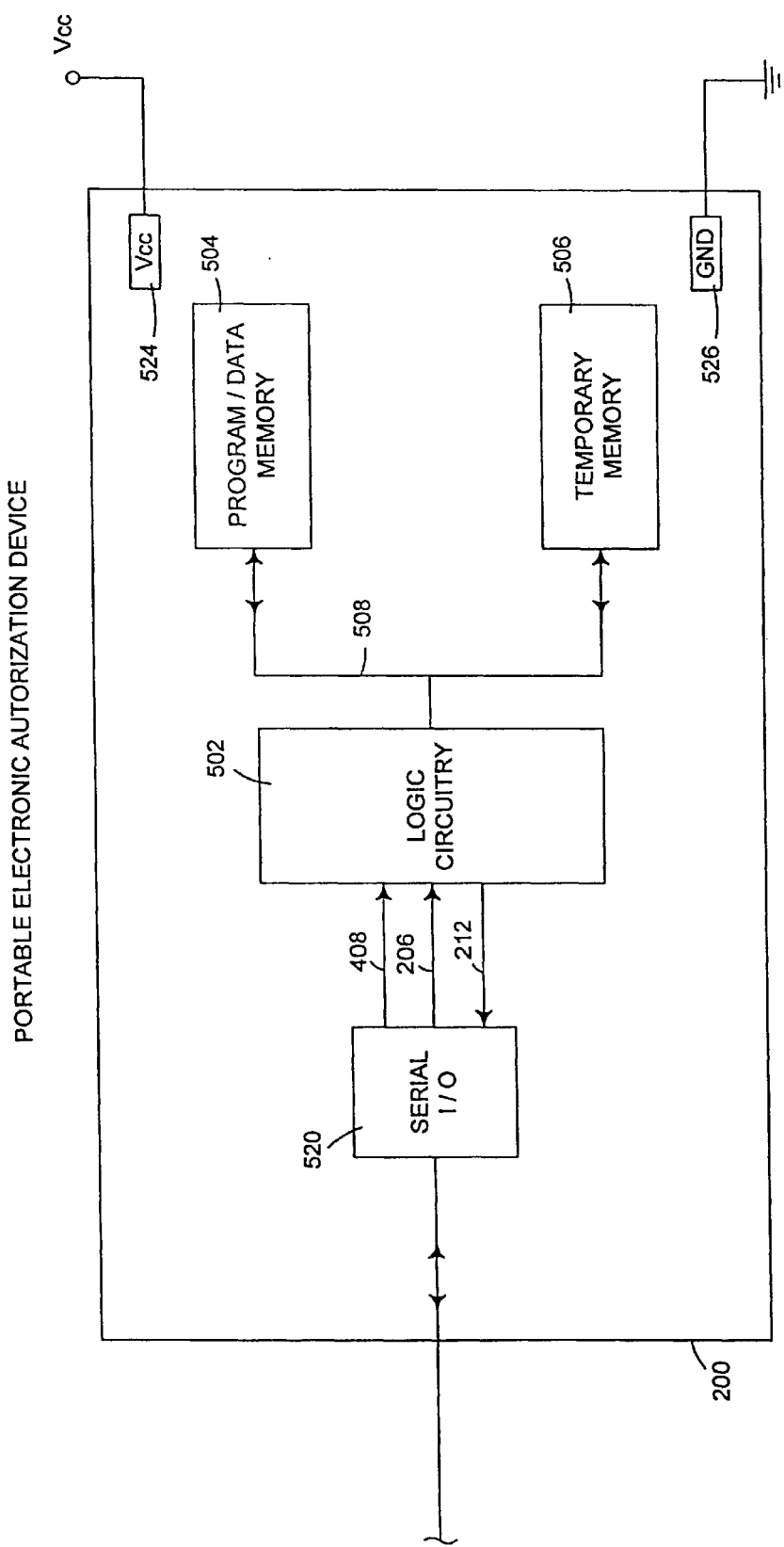
FIG. 5B illustrates one implementation of a PEAD wherein the PEAD circuitries are implemented on an IC.

FIG. 5B illustrates one implementation of a PEAD wherein the circuitries are implemented on an IC. In FIG. 5B, components having like reference numbers to components in FIG. 5A have similar functions. Data paths 408, 206, and 212, which have been described in connection with FIG. 5A, is coupled to a serial I/O circuit 520, which facilitates data transmission and receipt in a serial manner on data path 522 between PEAD 200 and the electronic transaction system. Vcc pin 524 and ground pin 526, which provide power to PEAD 200 of FIG. 5B, are also shown.

Figure 5C:
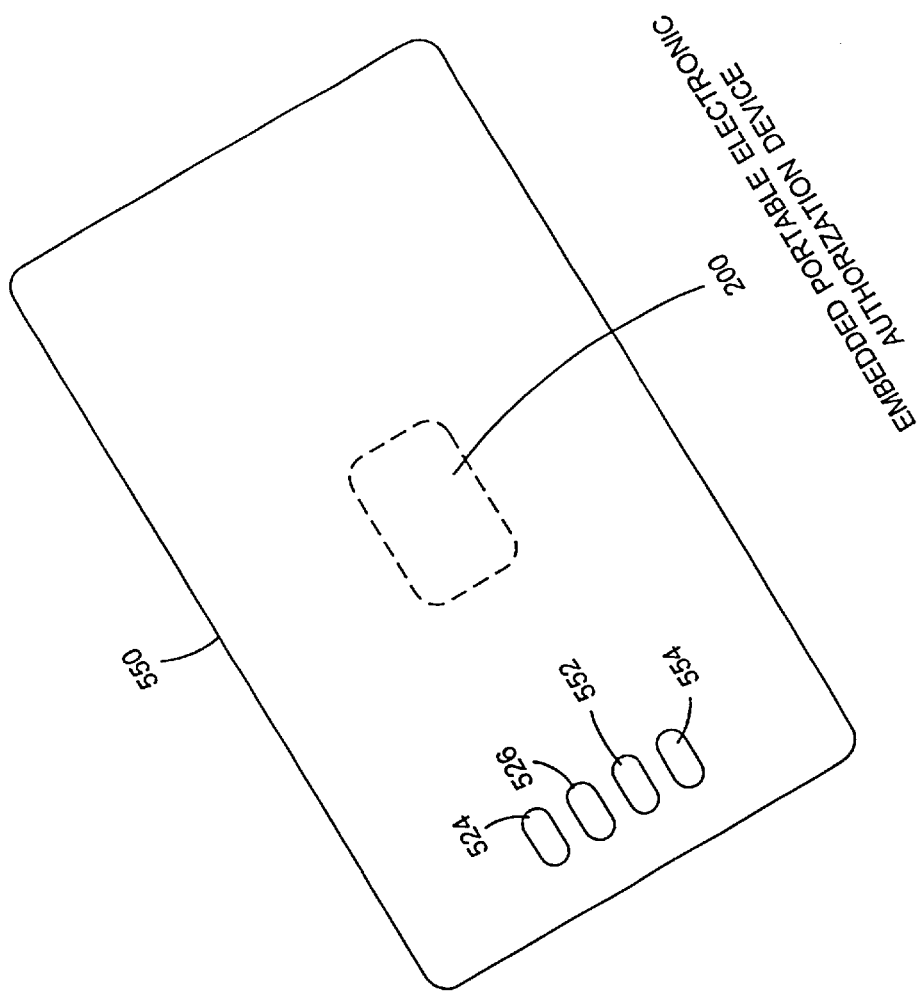
FIG. 5C represents an external view of the PEAD of FIG. 5B after being embedded in a card-like package.

FIG. 5C represents an external view of the PEAD of FIG. 5B after being embedded in a card-like package for ease of carrying and insertion into a serial I/O port of the electronic transaction system. Card 550, which embeds the integrated circuit implementing the inventive PEAD, includes, in one embodiment, four external contacts. External serial contacts 552 and 554 carry data and ground respectively to facilitate serial communication with a serial device of an electronic transaction system. External Vcc contact 524 and external ground contact 526, which supply power to the PEAD as discussed in connection with FIG. 5A, are also shown. When card 550 is inserted into an electronic transaction system, it is powered through external contacts 524 and 526, thereby enabling the PEAD circuitries therein to receive transaction requests via external serial contacts 552 and 554, approve the requests within the PEAD if appropriate, encrypt transaction approval data within the PEAD circuitries, and serially communicate the encrypted transaction approval data to the electronic transaction system via external serial contacts 552 and 554.

Figure 6A:
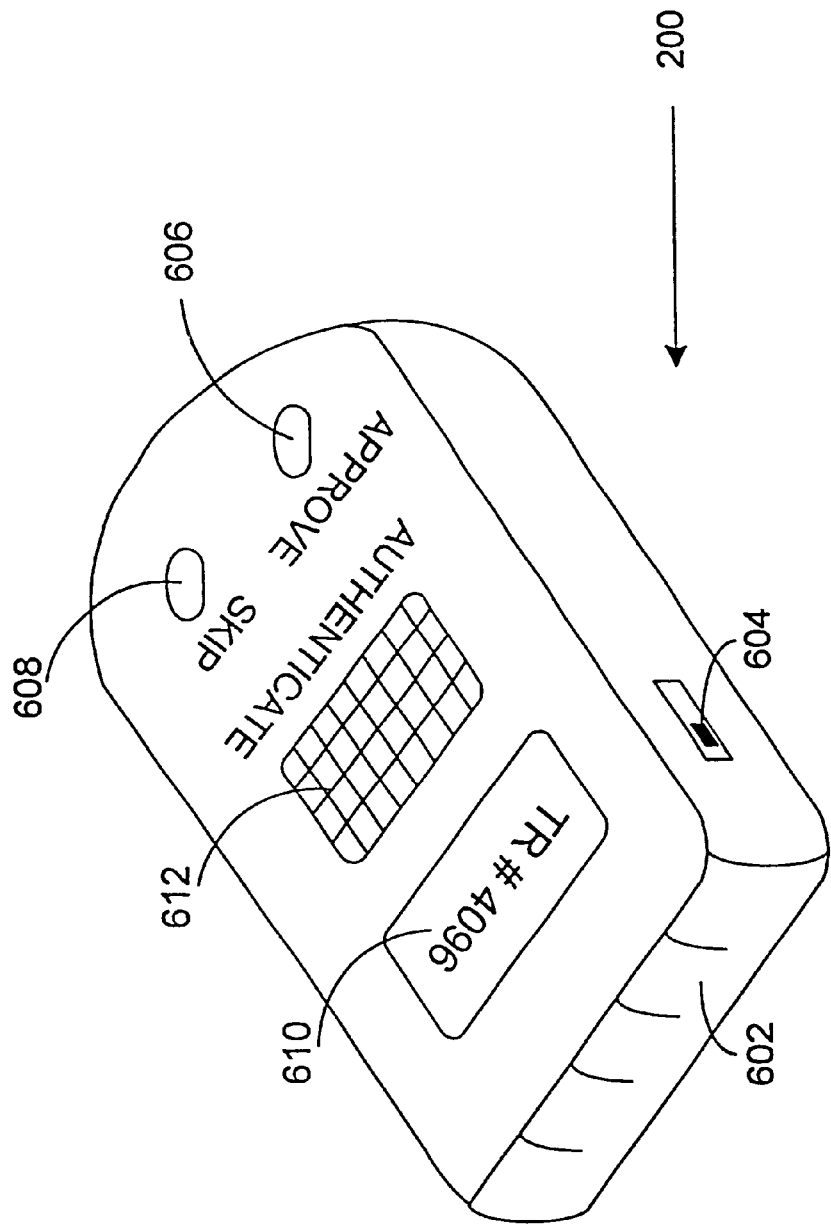
FIG. 6A illustrates an external view of the PEAD in accordance with a preferred embodiment of the present invention.

FIG. 6A represents an external view of a PEAD in accordance with a preferred embodiment of the present invention. PEAD 200 of FIG. 6A is preferably implemented as a small, self-containing package that is sufficiently ruggedized for daily use in the field. Preferably, PEAD 200 of FIG. 6A is small enough to be comfortably carried with the user at all times, e.g., as a key chain attachment or a small package that can easily fit inside a purse or a wallet. The physical enclosure of PEAD 200 is preferably arranged such that the content will be tamper-proof (i.e., if it is opened in an unauthorized manner then the user's private key and/or the user identification data will be destroyed or the PEAD will no longer be able to approve transactions). By way of example, the enclosure may be arranged such that if it is opened, there is a change in the flow of current in a current path, e.g., either the existing current flow is interrupted or a current path that has been idle starts to flow. The change in the flow of current may then force RESET of the circuitry, including erasing the private key in the memory.

There is shown an infrared communication port 602 for receiving and transmitting data vis-à-vis the electronic transaction system. A small on/off switch 604 permits the user to turn off the PEAD to conserve power when not in use. Approve button 606 permits the user to signify approval of a proposed transaction. Optional skip button 608 permits the user to indicate rejection of a particular transaction. Skip button 608 may be omitted since a transaction request may be understood, in some embodiment, as not being approved if approve button 606 is not activated within a given period of time after receiving the request.

Optional display 610 may be implemented using any type of display technology such as liquid crystal technology. Displays 610 displays, among others, the transaction being proposed for approval. Display 610 may be omitted if desired, in which case the transaction may be viewed, for example, at a display associated with the electronic transaction system itself. Optional user authentication mechanism 612 prevents PEAD 200 from being used for approving transactions unless the user is able to identify himself to PEAD 200 as the rightful and authorized user. Optional user authentication mechanism 612 may require the user to enter a password, to furnish a fingerprint or a voice print, or other biometrics and/or identifying characteristics specific to the authorized user before PEAD 200 can be activated and employed for approving transactions.

Figure 6B:
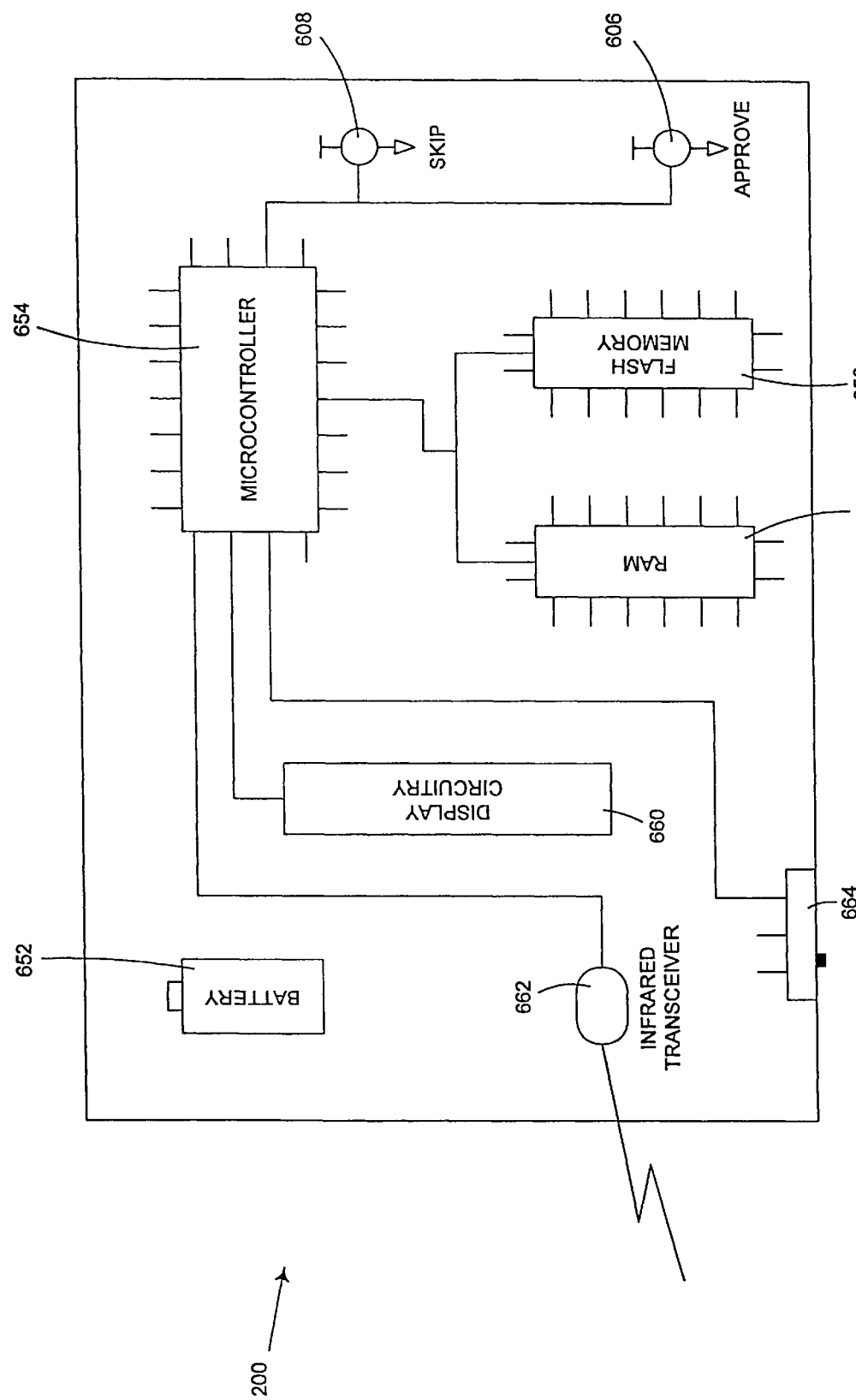
FIG. 6B illustrates, in a simplified manner and in accordance with one aspect of the present invention, the hardware for implementing the PEAD of FIG. 6A

FIG. 6B illustrates, in a simplified manner and in accordance with one aspect of the present invention, the hardware for implementing PEAD 200 of FIG. 6A. Battery 652 provides power to the circuitry of PEAD 200. A microcontroller 654 executes codes stored in flash memory 656 and employs random access memory 658 for the execution. In one embodiment, microcontroller 654, flash memory 656, and even random access memory 658 may be implemented on a single chip, e.g., a NC68HC05SCXX family chip from Motorola Inc. of Schaumburg, Ill. such as the NC68HC05SC28. Approve button 606 and optional skip button 608 are coupled to microcontroller 654 to permit the user to indicate approval or rejection of a particular transaction displayed using display circuitry 660. Communication to and from the electronic transaction system is accomplished under control of microcontroller 654 via an infrared transceiver 662. Power switch 664 permits the user to power off PEAD 200 when not in use to conserve power and to prevent accidental approval.

Figure 7:
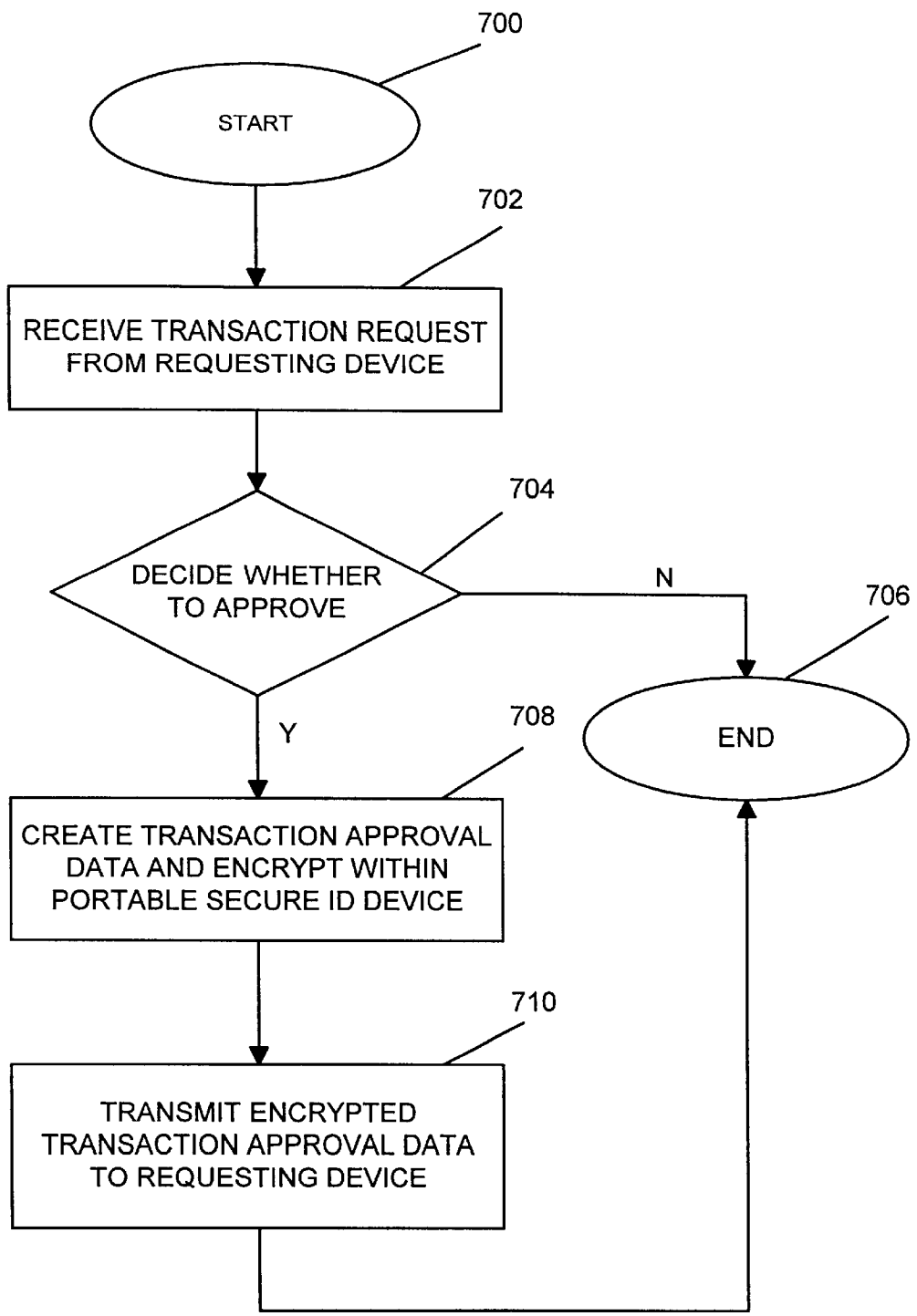
FIG. 7 is a flowchart illustrating, in accordance with one aspect of the present invention, the approval technique employing the inventive PEAD.

FIG. 7 is a flowchart illustrating, in accordance with one aspect of the present invention, the approval technique employing the inventive PEAD. In step 702, a transaction request is received at the PEAD from the requesting device associated with the electronic transaction system. In step 704, the user has the option whether to approve or disapprove the transaction proposed. If not approved, e.g., either by activating the skip button of the PEAD or simply allowing the request to time out, nothing will be done.

On the other hand, if the user approves the proposed transaction, the user may activate the approve button to create transaction approval data. The transaction approval data is then encrypted in step 708 within the PEAD. In step 710, the encrypted transaction approval data is transmitted to the requesting device of the electronic transaction system after being encrypted.

Figure 8:
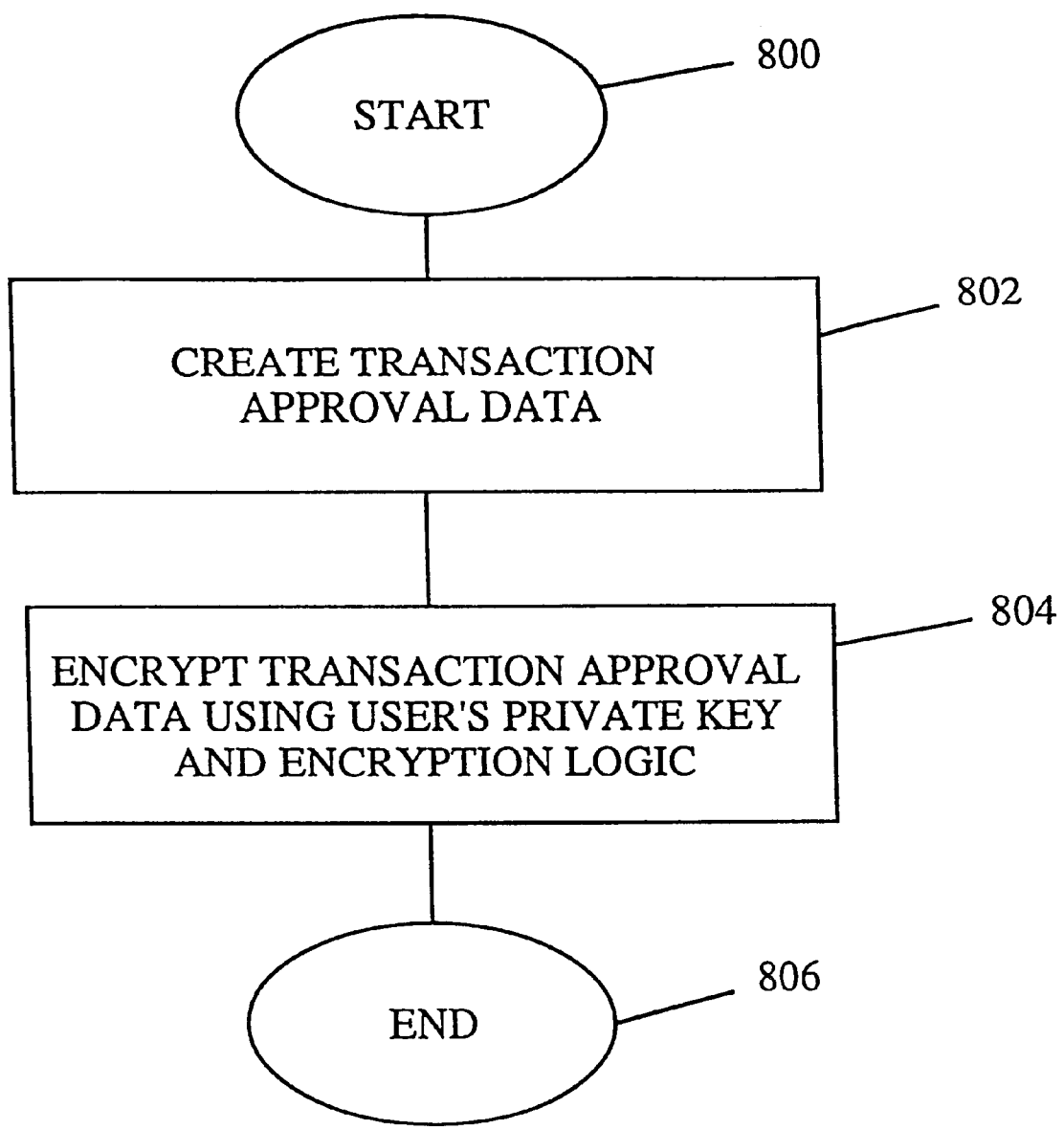
FIG. 8 is a flowchart illustrating, in accordance with one aspect of the present invention, steps involved in encrypting transaction approval data using a public key cryptography technique.

FIG. 8 is a flowchart illustrating, in accordance with one aspect of the present invention, the steps involved in encrypting transaction approval data using public key cryptography. In step 802, the transaction approval data package is created. As discussed earlier in connection with FIG. 3B, the transaction approval data may be created by appending any necessary user identification data to a portion of or the entire transaction request. Optionally, a time stamp may also be appended thereto. In step 804, the transaction approval data is encrypted using the user's private key, which is preferably kept secured at all times within the PEAD. Thereafter, the encrypted transaction approval data is transmitted back to the electronic transaction system.

In accordance with one aspect of the present invention, it is recognized that even if the encrypted transaction approval data is intercepted and decrypted for analysis by a third party, it is not possible to bypass the security features of the invention as long as the user's private key or the user identification data is secure. As mentioned earlier, since the user identification data is not accessible externally, it is always secure within the PEAD. This is unlike the prior art wherein the user is required to enter the identification data, e.g., password, at the electronic transaction system and risks exposure of this sensitive data.

Even if the user identification data is compromised, transaction approval still cannot take place unless there is possession of the user's private key. It would be useless to intercept the encrypted transaction approval data even if one can decrypt it using the user's public key since the transaction partner, e.g., the merchant requesting approval of the transaction, will not accept any transaction approval data not encrypted using the user's private key. Again, since the private key is not accessible externally, it is always secure within the PEAD. This aspect of the invention has great advantages in performing on-line transactions since the user's private key no longer has to be stored in a vulnerable computer file in a workstation, which may be accessible by other parties and may be difficult to conveniently tote along for other authentication tasks.

The fact that the PEAD is implemented in a small, portable package makes it convenient and comfortable for the user to maintain the PEAD within his possession at all times. Even if the PEAD is physically stolen, however, the optional user authentication mechanism, e.g., user authentication mechanism 612 of FIG. 6A, provides an additional level of protection and renders the PEAD useless to all but the properly authenticated user. Of course the user can always notify the issuer of the PEAD if the PEAD is stolen or lost, and the issuer can inform transaction partners to refuse any transaction approval data encrypted with the user's private key of the stolen PEAD.

The fact that the transaction approval data includes the time stamp, the merchant's name, the amount approved, and other relevant data also enhances the integrity of the transaction approval process. If the merchant inadvertently or intentionally submits multiple transaction approvals to the issuer, the issuer may be able to recognize from these data items that the submissions are duplicates and ignore any duplicate transaction approval data. For example, the issuer may recognize that is it unlikely for a user to purchase multiple identical dinners at the same restaurant at a given time and date.

In one embodiment, the disclosed PEAD may be implemented within a computer to further improve transactional security and the confidentiality of the user private key and/or user identification data and/or the firmware identification data. The firmware identification data can be signed by the issuer or the manufacturer private key. By way of example, the PEAD may be implemented as firmware on the motherboard of a computer (such as a workstation, a personal computer or a Personal Digital Assistance (PDA)) or on a card designed to coupled with (or plugged into) the computer motherboard. In such an embodiment, the PEAD non-volatile memory (e.g., the circuitry employed to store the private key or user ID data or the firmware ID data) as well as the PEAD logic circuitry (e.g., the circuitry employed to implement the encryption/decryption logic and optionally the key generation logic and/or random number generator) may be implemented as a single chip or set of chips within the confines of the computer enclosure.

Figure 9A:
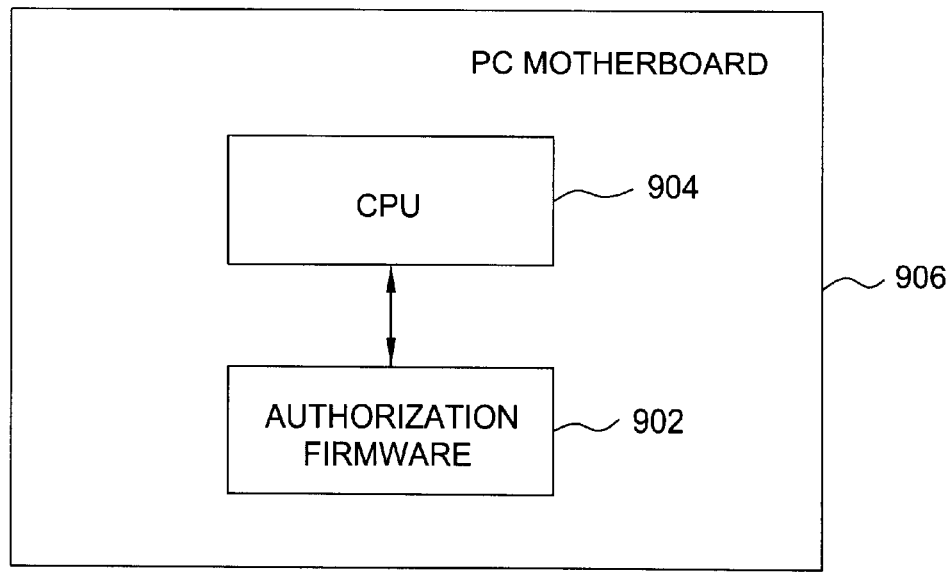
FIG. 9A depicts the general architecture of such an embodiment wherein the PEAD is implemented as authorization firmware that is in electronic communication with CPU of the computer motherboard.

FIG. 9A depicts the general architecture of such an embodiment wherein the PEAD is implemented as authorization firmware 902 that is in electronic communication with CPU 904 of computer motherboard 906. Note that in FIG. 9A, many conventional and known details pertaining to interfacing a chip or a set of chips to the CPU have been omitted to simplify the discussion. Likewise, many conventional and known details pertaining to the computer motherboard are also omitted to simplify the discussion.

Figure 9B:
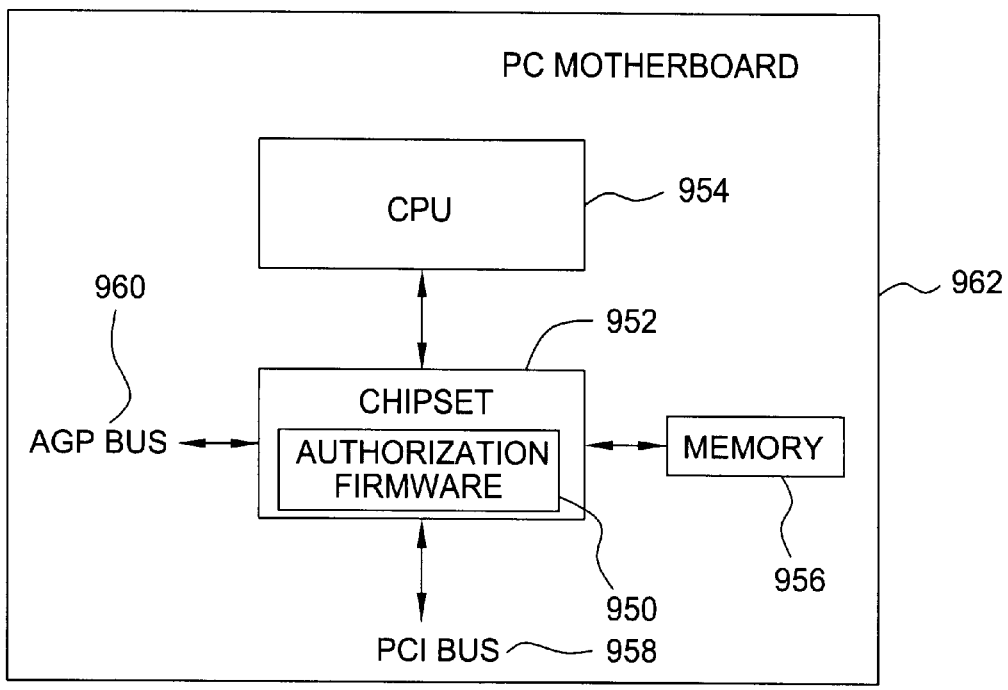
FIG. 9B illustrates one such embodiment wherein the PEAD is implemented as authorization firmware embedded within a PC chipset.

In one embodiment, the PEAD may be embedded within the PC chipset, i.e., the set of ICs (usually called corelogic) employed to interface the CPU, the system memory, the peripheral bus (such as a PCI bus), and/or the graphics bus (such as an AGP bus). FIG. 9B illustrates one such embodiment wherein the PEAD is implemented as authorization firmware 950 embedded within PC chipset 952. Also as shown, PC chipset 952 is shown interfacing between CPU 954, system memory 956, PCI bus 958, and AGP bus 960 of computer motherboard 962. Again, note that many conventional and known details pertaining to the computer motherboard are also omitted to simplify the discussion.

As mentioned earlier, the private key may be generated internally within the PEAD using an appropriate key generation logic. If the PEAD is implemented as authorization firmware to be embedded on the computer motherboard (either as a standalone chip or set of chips or within the PC chipset), such key generation logic may be employed, upon receiving the appropriate command, to generate the set of private key/public key entirely within the authorization firmware and store the private key in the nonvolatile memory portion of the authorization firmware, thereby rendering the private key secure (since no copy ever exists outside the authorization firmware). If desired, a random number generator implemented in the logic portion of the authorization firmware may be employed to provide a random seed number for generating the set of private key/public key, further enhancing security. In one embodiment, the random number generator may also be made accessible to the host computer for other cryptographic purposes. The random number generator itself may generate the random seed number by, for example, same bus utilization at a given point in time and/or chipset data traffic and/or the temperature (thermal noise) of the firmware and/or the firmware ID signed by the issuer or the manufacturer and/or the current time and/or the power variation (power noise) of the firmware.

As can be appreciated from the foregoing, the PEAD may be implemented as firmware (i.e., become embedded on one or more chips) on the computer motherboard or a plug-in board to enable the computer to conduct secure transactions while preserving the confidentiality and security of the private key and the user ID data (since access to such private key and user ID data must still traverse the encryption/decryption logic of the firmware). Since the private key and the user ID data and firmware ID is stored in the nonvolatile memory and their access is safeguarded by the encryption/decryption logic, the present approach to personalizing the computer for authenticating the user is inherently more secure than a software-oriented approach, which exposes the confidential data to being copied from the hard drive of the computer.

Further, the embedding of the PEAD as authorization firmware (either as a standalone chip or set of chips or within the PC chipset) on the computer motherboard or a plug-in board enables communication between the PEAD and the computer to take place within the secure confines of the enclosure of the computer, further adding to the security of the transaction. These embedded implementations are particularly advantageous when the computer is employed to authorize transactions, e.g., to authorize purchases, to perform document authentication, to sign legal document, to conduct banking transactions, or to perform online security trading, with electronic transaction systems connected in a network (such as the Internet).

While this invention has been described in terms of several prefer. red embodiments, there are alterations, permutations, and equivalents which fall within the scope of this invention. It should also be noted that there are many alternative ways of implementing the methods and apparatuses of the present invention. By way of example, while the discussion herein has focused on transaction approvals, it should be apparent to those skilled that the PEAD may be employed to conduct any kind of transaction vis-à-vis an electronic transaction system any time secured data transmission from the user to the electronic transaction system is preferred. For example, the PEAD may be employed for logging into highly sensitive computer systems or facilities. When so implemented, the computer terminal with which the PEAD communicates may be equipped with an infrared port, a magnetic reader port, or a contact-type plug for communication with the PEAD. The user may then employ the PEAD to perform any type of authentication tasks online.

As a further example, the PEAD may be employed to "sign" any computer file for authentication purposes (e.g., to authenticate the date or the user). The transaction approval data may then be saved along with the file to be authenticated for future reference. It is understood that the digital signature is one of the special case of the public key encryption schemes. When the encryption mentioned in the context of PEAD, it shall be understood that it covers all public key encryption schemes including digital signature. For example, when "data is encrypted by an issuer private key" this means either a pure data directly been encrypted by an issuer private key or the derivative of the data (e.g. the digest of to the data generated by a hashing function) been encrypted by an issuer private key. Note that the transaction authentication data is again tamper-proof since any transaction authentication data not encrypted using the user's private key will not be accepted as authentic. Also, it should be apparent that if the PEAD is employed to approve only predefined transactions, the transaction data may be stored in advance within the PEAD and do not need to be received from externally by the PEAD. It is therefore intended that the following appended claims be interpreted as including all such alterations, permutations, and equivalents as fall within the true spirit and scope of the present invention.

What is claimed is:

1. A computer configured to signal approval of an electronic transaction request to an electronic transaction system remote from the computer, comprising:

a central processing unit;

electronic authorization firmware embedded either on a computer's motherboard or on a plug-in board that physically plugs into a computer's motherboard such that it is located in the secure confines of the enclosure of the computer and in electronic communication with said central processing unit, said electronic authorization firmware including:

a memory circuit configured to store a user private key, and at least one of user identification data or firmware identification data, and encryption logic circuit coupled to said electronic transaction system, said encryption logic circuit configured to approve a transaction request by encrypting said transaction request using said user private key, said encrypted transaction request signifying the transaction approval to said electronic transaction system.

2. The computer of claim 1 wherein said electronic authorization firmware is embedded on a chipset of said computer.

3. The computer of claim 1 wherein said user private key can be written into said memory circuit after it is decrypted from data that is encrypted using an issuer private key of an issuer of said electronic authorization firmware.

4. The computer of claim 3 wherein at least one of a user identification data or a firmware identification data can be written into said memory circuit after it is decrypted from data that is encrypted using an issuer private key of an issuer of said electronic authorization firmware.

5. The computer of claim 1 wherein said private user key is not transmitted from said electronic authorization firmware during said encryption of said transaction.

6. The computer of claim 1 wherein said user identification data is not transmitted from said electronic authorization firmware during said encryption of said transaction without being encrypted by said user private key.

7. The computer of claim 1 further including means for erasing said at least one of said user private key and said user identification data if said electronic authorization firmware is tampered with.

8. The electronic authorization firmware of claim 1 wherein said transaction request is initiated by said electronic transaction system.

9. The electronic authorization firmware of claim 1 wherein the firmware identification data is digitally signed by at least one of the issuer private key and a manufacturer private key.

10. A method for configuring electronic authorization firmware according to claim 1 to authenticate, in a secure manner, a user to an electronic transaction system, comprising:

receiving at said electronic authorization firmware a first signal requesting configuration;

generating, using a key generation logic within said electronic authorization firmware, a user private key and a user public key;

storing said user private key at a non-volatile memory circuit within said electronic authorization firmware; and outputting said user public key, thereby permitting said electronic transaction system to decrypt digital data previously encrypted with said user private key by said electronic authorization firmware.

11. The method of claim 10 wherein said user private key exists only in said non-volatile memory circuit of said electronic authorization firmware, said user private key is not transmitted from said electronic authorization firmware during said configuring or subsequent authenticating.

12. The method of claim 10 further comprising erasing said user private key if said electronic authorization firmware is tampered with.

13. The method of claim 10 further comprising erasing said user identification data if said electronic authorization firmware is tampered with.

14. The method of claim 10 wherein said electronic authorization firmware is embedded on a motherboard of a computer.

15. The method of claim 10 wherein said electronic authorization firmware is embedded on a plug-in board that is designed to plug into a motherboard of a computer.

16. The method of claim 10 wherein said electronic authorization firmware is embedded on a Chipset of a computer.

17. The computer of claim 1 wherein decryption logic circuitry is disposed between said memory circuit and said electronic transaction system, said decryption logic circuitry being configured to prevent unauthorized access to said at least one of said user private key and said user identification data in said memory circuit;

wherein said encryption logic circuit is configured to transmit digital data encrypted using said user private key for transmission to said electronic transaction system, said digital data authenticating said user to said electronic transaction system, and wherein said memory circuit is inaccessible by said central processing unit without traversing said decryption logic circuitry.

18. The computer of claim 17 wherein said memory circuit can be accessed only through said decryption logic circuitry.

19. The computer of claim 17 wherein said memory circuit is inaccessible from said central processing unit without traversing said decryption logic circuitry.

20. The computer of claim 1 wherein the memory is non-volatile.

21. The computer of claim 1 wherein the memory stores at least one of the user private key, user identification data and firmware identification data.

22. An electronic authorization firmware configured to be embedded in a computer, said electronic authorization firmware being configured to authenticate a user of said computer to an electronic transaction system, comprising:

a non-volatile memory circuit, embedded either on a computer's motherboard or on a plug-in board that physically plugs into a computer's motherboard such that it is located in the secure confines of the enclosure of the computer, configured to store at least one of a user private key and user identification data and firmware identification data;

decryption logic circuitry, embedded either on a computer's motherboard or on a plug-in board that physically plugs into a computer's motherboard such that it is located in the secure confines of the enclosure of the computer, disposed between said non-volatile memory circuit and said electronic transaction system, said decryption logic circuitry being configured to prevent unauthorized access to said at least one of said user private key and aid user identification data and firmware identification data in said non-volatile memory circuit, and encryption logic circuit, embedded either on a computer's motherboard or on a plug-in board that physically plugs into a computer's motherboard such that it is located in the secure confines of the enclosure of the computer, coupled to said electronic transaction system, said encryption logic circuit configured to transmit digital data encrypted using said user private key for transmission to said electronic transaction system, said digital data authenticating said user to said electronic transaction system.

23. The electronic authorization firmware of claim 22 further comprising a random number generator coupled to receive a request by said computer to generate a random seed number, said random number generator being configured to generate said random seed number upon said request.

24. The electronic authorization firmware of claim 23 wherein said random seed number is sampled from data pertaining to at least one of bus utilization, chipset data traffic, firmware temperature, power variation, and current time.

25. The electronic authorization firmware of claim 22 further comprising key generation logic coupled to said non-volatile memory and said decryption logic, said decryption logic, said decryption logic being configured to prevent unauthorized access to said key generation logic, said key generation logic being configured to generate said user private key within said electronic authorization firmware upon request by said computer.

* * * * *